(12) United States Patent
Malige et al.

(10) Patent No.: US 8,751,768 B2
(45) Date of Patent: Jun. 10, 2014

(54) DATA STORAGE RECLAMATION SYSTEMS AND METHODS

(75) Inventors: Ragupathi Malige, San Jose, CA (US); Ryan Robert Lefevre, Sunnyvale, CA (US); Edwin Frederick Menze, III, Portland, OR (US); Sunil Kumar Tekkatte Subramanya, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 307 days.

(21) Appl. No.: 13/098,294

(22) Filed: Apr. 29, 2011

(65) Prior Publication Data

US 2012/0278580 A1 Nov. 1, 2012

(51) Int. Cl.
G06F 12/00 (2006.01)

(52) U.S. Cl.
USPC ............................................. 711/170; 710/52

(58) Field of Classification Search
None
See application file for complete search history.

(56) References Cited

U.S. PATENT DOCUMENTS

| | | | | |
|---|---|---|---|---|
| 6,128,715 | A * | 10/2000 | Wang et al. | 711/168 |
| 6,314,501 | B1 * | 11/2001 | Gulick et al. | 711/153 |
| 7,353,350 | B2 * | 4/2008 | Klassen et al. | 711/159 |
| 7,603,532 | B2 | 10/2009 | Rajan et al. | |
| 7,631,155 | B1 | 12/2009 | Bono et al. | |
| 7,653,832 | B2 | 1/2010 | Faibish et al. | |
| 7,676,704 | B2 | 3/2010 | Hong et al. | |
| 7,694,082 | B2 | 4/2010 | Golding et al. | |
| 7,822,939 | B1 | 10/2010 | Veprinsky et al. | |
| 7,941,709 | B1 | 5/2011 | Hong et al. | |
| 8,438,362 | B2 | 5/2013 | Mukherjee et al. | |
| 2008/0189498 | A1 | 8/2008 | Brown | |
| 2010/0049735 | A1 * | 2/2010 | Hsu | 707/103 R |
| 2010/0191908 | A1 | 7/2010 | Yamakawa | |
| 2011/0010495 | A1 * | 1/2011 | Haustein et al. | 711/111 |
| 2012/0054746 | A1 | 3/2012 | Vaghani et al. | |
| 2012/0198443 | A1 | 8/2012 | Tatavarty | |
| 2012/0260050 | A1 | 10/2012 | Kaliannan | |
| 2012/0271870 | A1 | 10/2012 | Patwardhan et al. | |
| 2012/0311291 | A1 | 12/2012 | Fiske et al. | |
| 2013/0073914 | A1 | 3/2013 | Kaul et al. | |

OTHER PUBLICATIONS

Schreuder, Willem A. "Accessing Files on Unmounted File Systems." Proceedings of the LISA 2001 15th Systems Administration Conference. Dec. 2-7, 2001, San Diego California. 7 pages.

* cited by examiner

*Primary Examiner* — Matthew Bradley
*Assistant Examiner* — Candice Rankin
(74) *Attorney, Agent, or Firm* — Wilmer Cutler Pickering Hale and Dorr LLP

(57) ABSTRACT

Storage systems and methods are presented. In one embodiment, a storage reclamation method comprises performing a potential reclamation identification process, wherein the potential reclamation identification process includes determining if there is the potential for reclaiming storage resources; performing a reclamation process, wherein reclamation is performed on storage resources identified by the potential reclamation identification process as being eligible for reclamation, and wherein the storage resources correspond to free space associated with a data file; and performing a valid free space indication process, wherein a valid free space indication process includes forwarding a valid free space indication recognizable to an application as a valid free space indication when the application attempts to direct a read to the storage spaces reclaimed by the reclamation process.

20 Claims, 9 Drawing Sheets

100

110
Performing a potential reclamation identification process.

120
Performing a reclamation process.

130
Performing a valid free space indication process.

210
The application is quiesced

---

220
Information associated with storage resources is gathered.

---

230
The information associated with storage resources is analyzed.

---
310
Performing a reclamation preparation process.

---
320
Performing reclamation of the storage resources.

410
Acquiring a valid free space indication.

420
The valid free space indication is returned to attempted reads by an application to the reclaimed storage resource locations.

| 710
Potential reclamation identification module. |
|---|
| 720
Reclamation module. |
| 730
Valid free space indication module. |

FIG 7

DATA STORAGE RECLAMATION SYSTEMS AND METHODS

FIELD OF THE INVENTION

The present embodiments relate to the field of information storage and storage resource reclamation.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information.

Some conventional storage approaches attempt to utilize thin storage to provision a primary storage resource (e.g., primary volume group, etc.). The virtual nature of thin storage can offer some flexibility to create a very large volume (e.g., storage container for the filesystem, etc.). Some of the thin provisioning capable intelligent storage arrays deploy ZPR (zero page reclaim) techniques to reclaim unused application data. However, this approach usually does not work well for many commonly used applications (e.g., databases, etc.). Reclamation is often particularly problematic for applications that initialize datafiles with non-zero blocks. This can be done to make sure a filesystem allocates storage for the entire data file and during table creation it need not worry about out of space situations. When the table is deleted and or purged, the freed blocks are added to the tablespace free list and not usually initialized to zero. These characteristics can make it difficult to reclaim unused blocks within a data file.

Some of the conventional storage approaches attempt to reclaim storage resources that are associated with a filesystem but are not assigned to an application. However, conventional attempts to reclaim storage resources that are assigned to an application data file are often complicated and difficult. The traditional approaches typically involve moving application data, shrinking the files (e.g., including coalescing table freespace via SQL and migrating free blocks to the end of a file, online redefinition of a table into a new container and deleting data from old location, etc.), and attempting to reallocate remaining free space back to the filesystem, after which an attempt is made to reclaim the storage spaces that were reallocated or reassigned to the filesystem. These attempts are often resource intensive and usually limited in flexibility with regards to reclaiming storage resources (e.g., they can take a long time, application performance can suffer, etc.).

SUMMARY

Storage systems and methods are presented. In one embodiment, a storage reclamation method comprises performing a potential reclamation identification process, wherein the potential reclamation identification process includes determining if there is the potential for reclaiming storage resources; performing a reclamation process, wherein reclamation is performed on storage resources identified by the potential reclamation identification process as being eligible for reclamation, and wherein the storage resources correspond to free space associated with a data file; and performing a valid free space indication process, wherein a valid free space indication process includes forwarding a valid free space indication recognizable to an application as a valid free space indication when the application attempts to direct a read to the storage spaces reclaimed by the reclamation process.

In one embodiment, the valid free space indication is application specific. In one exemplary implementation, the reclaimed storage resources are marked with an application fill on demand indicator. The valid free space indication can be a repeatable bit pattern. The valid free space indication can be generated by the valid free space indication process based upon the location of the storage resource. In one embodiment, the application is a database. The reclamation process can include resolving in flight input and output to the reclaimed storage locations.

In one embodiment, a reprogrammable tangible computer readable medium has stored thereon, computer executable instructions that when executed by a computer system cause the computer system to perform a method comprising: performing a potential reclamation identification process, wherein the potential reclamation identification process includes determining if there is the potential for reclaiming storage resources; performing a reclamation process, wherein reclamation is performed on storage resources identified by the potential reclamation identification process as being eligible for reclamation, and wherein the storage resources correspond to free space associated with a data file; and performing a valid free space indication process, wherein a valid free space indication process includes forwarding a valid free space indication recognizable to an application as a valid free space indication when the application attempts to direct a read to the storage spaces reclaimed by the reclamation process.

In one embodiment, the valid free space indication is application specific. In one exemplary implementation, the reclaimed storage resources are marked with an application fill on demand indicator. The valid free space indication can be a repeatable bit pattern. The valid free space indication can be generated by the valid free space indication process based upon the location of the storage resource. In one embodiment, the application is a database. The reclamation process includes resolving in flight input and output to the reclaimed storage locations.

In one embodiment, a computer system comprises a processor coupled to a computer readable storage media and executes computer readable code which causes the computer system to perform operations including: performing a potential reclamation identification process, wherein the potential reclamation identification process includes determining if there is the potential for reclaiming storage resources; performing a reclamation process, wherein reclamation is performed on storage resources identified by the potential reclamation identification process as being eligible for reclamation, and wherein the storage resources correspond to free space associated with a data file; and performing a valid free space indication process, wherein a valid free space indication process includes forwarding a valid free space indication recognizable to an application as a valid free space indication when the application attempts to direct a read to the storage spaces reclaimed by the reclamation process.

In one embodiment, the valid free space indication is application specific. In one exemplary implementation, the reclaimed storage resources are marked with an application fill on demand indicator. The valid free space indication can be a repeatable bit pattern. The valid free space indication can be generated by the valid free space indication process based upon the location of the storage resource. In one embodiment, the application is a database. The reclamation process includes resolving in flight input and output to the reclaimed storage locations.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is block diagram of an exemplary storage reclamation method in accordance with one embodiment of present invention.

FIG. 2 is a block diagram of an exemplary potential reclamation identification process in accordance with one embodiment of the present invention.

FIG. 3 is a block diagram of an exemplary reclamation process in accordance with one embodiment of the present invention.

FIG. 4 is a block diagram of an exemplary valid free space indication process in accordance with one embodiment of the present invention.

FIG. 7 is a block diagram of an exemplary storage resource management module in accordance with one embodiment of the present invention.

DETAILED DESCRIPTION

Figure 5:
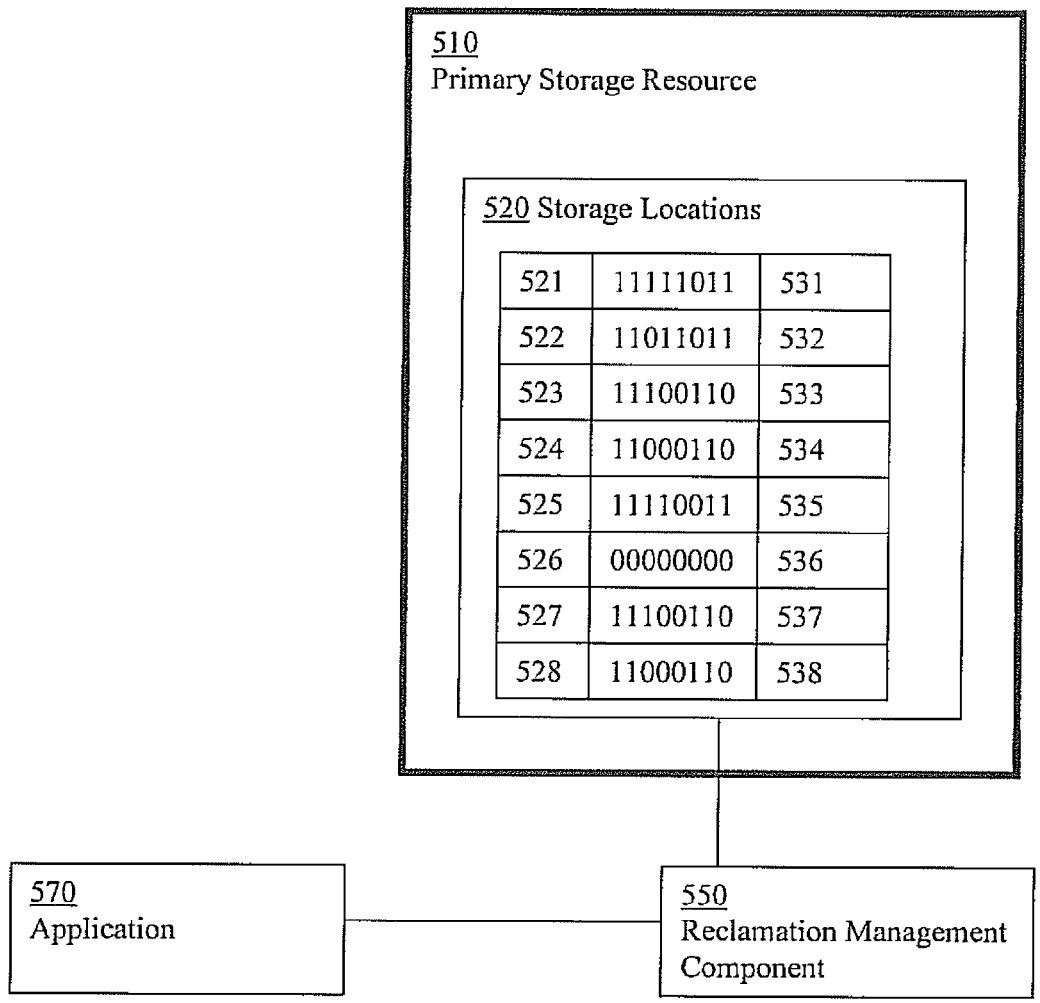
FIG. 5 is a block diagram of an exemplary reclamation system in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Reclamation systems and methods described in the following detailed description can facilitate efficient and effective reclamation of storage resources. It is appreciated that many of the application fill on demand indication operations and corresponding reclamation operations are described with respect to storage resources. In one embodiment, the reclamation is performed on storage resources assigned to an application data file and the reclamation is performed "within" the data file rather than storage resources generically assigned to a filesystem. It is appreciated that the present reclamation systems and methods can be utilized for a variety of data structures (e.g., data file, digital image, complex objects, etc.). In one embodiment, the present reclamation systems and methods are utilized to reclaim storage resources assigned to a data file associated with a database. While many of the application operations are described with respect to a database, it is appreciated that the present reclamation systems and methods can be utilized with a variety of applications (e.g., database applications, spreadsheet applications, word processing applications, etc.). The reclamation systems and methods can be utilized to figure out application (e.g., database, etc.) unused blocks and reclaim the storage from thin provision aware disk arrays. In one embodiment, unused blocks of storage resources are marked with a special flag or indicator (e.g., an application fill on demand indicator, etc.) that triggers generation of an application specific pattern for response to reads directed at locations within the unused blocks of storage resources. In one exemplary implementation, the unused blocks of storage resources are identified based upon an analysis of how an application deals with unused blocks.

FIG. 1 is block diagram of exemplary storage reclamation method 100 in accordance with one embodiment of present invention.

In block 110, a potential reclamation identification process is performed. In one embodiment, the potential reclamation identification process includes determining if there is the potential for reclaiming storage resources. In one exemplary implementation, information regarding an application is utilized to identify unused blocks in the file associated with the application.

In block 120, a reclamation process is performed. In one embodiment, this reclamation is performed on storage resources identified by the potential reclamation identification process as being eligible for reclamation. In one exemplary implementation, the storage resources correspond to free space associated with a data file. In one embodiment, the reclaimed storage resources are marked with an application fill on demand indicator. The application fill on demand indicator can be utilized to indicate that application specific data (e.g., an application specific a valid free space indication, etc.) is generated in response to attempted reads directed at the reclaimed storage resources. An indication of the storage resources (e.g., storage locations, storage blocks, storage pages, etc.) marked with the application fill on demand indicator is forwarded to storage resources (e.g., a disk array, etc.) and the identified storage resources are reclaimed. In one exemplary implementation, the information can be forwarded to the storage resources via a storage volume manager.

In block 130, a valid free space indication process is performed. In one embodiment, a valid free space indication process includes forwarding a valid free space indication recognizable to an application as a valid free space indication when the application attempts to direct a read to the storage spaces reclaimed by the reclamation process. In one exemplary implementation, the valid free space indication is application specific. The valid free space indication can be a repeatable pattern (e.g., repeatable bit pattern, repeatable sequence, etc.).

FIG. 2 is a block diagram of exemplary potential reclamation identification process 200 in accordance with one embodiment of the present invention. In one embodiment, potential reclamation identification process 200 is similar to the potential reclamation identification process of block 110.

In block 210, the application is quiesced. In one embodiment, a database is quiesced using database specific information. In one exemplary implementation, an alter system suspend SQL operation is used. In one embodiment, when an application is in a suspended state the application inputs and outputs are suspended and new data blocks are not allocated (e.g., in a table, etc.).

In block 220, information associated with storage resources is gathered. In one embodiment, an application is queried for information regarding free space. In one exemplary implementation, information is retrieved from an application map indicating locations of free space. A query can be forwarded to the database free space catalog table. The query can be directed to retrieving information (e.g., filename, byte-offset-in-the-file, length, etc.) regarding potential free space. The database free space catalog table can include columns with various information (e.g., tablespace name, file identification, block identification, bytes, etc.). The information can include information regarding storage resources associated with a data file corresponding to an application (e.g., database, word processing, etc.). In one embodiment, information stored in the storage resources is retrieved.

In block 230, the information associated with storage resources is analyzed. In one embodiment, information received in block 210 from the database free space catalog is analyzed to determine free extents in tablespaces of the database. In one exemplary implementation, information retrieved from the storage resources is analyzed to determine if the information indicates there is free space that can potentially be reclaimed. Information stored in storage resource locations can include an indication that the storage location is available for reclamation (e.g., particular pattern of bits, mixed ones and zeros, all zeros, etc.).

The analysis of the information from the database free space catalog can include determining various information regarding application file storage (e.g., a file indication, an initial storage location offset indication, length of storage locations, etc.). The information can be included in a list that is returned in response to the query in block 220. In one embodiment, the list is examined to identify ranges which are larger than a particular value (e.g., MIN_TP_SIZE, etc.). The MIN_TP_SIZE is the minimum size of the disk offset range which can be reclaimed using thin provisioning. The MIN_TP_SIZE can depend on the type of the array. In one exemplary implementation, the list is referred to as list-A.

FIG. 3 as a block diagram of exemplary reclamation process 300 in accordance with one embodiment of the present invention. In one embodiment, reclamation process 300 is similar to the reclamation process used in block 120.

In block 310, a reclamation preparation process is performed. In one embodiment a filesystem is flushed so that in flight inputs and outputs reach the storage resource (e.g., storage medium, storage disk, etc.). In one exemplary implementation, storage resources identified for reclamation are marked with an application fill on demand indicator. The list-A obtained in block 220 can be used to ascertain the storage resources that are identified for reclamation and marked with an application fill on demand indicator. In one embodiment, a locking scheme is utilized to prevent race conditions. After the storage resources are marked with an application fill on demand indicator the application can be unquiesced. In one exemplary implementation, a database application is unquiesced using an alter system resume SQL operation.

In block 320, reclamation of the storage resources is performed. In one embodiment, after block 310 is performed and application fill on demand indicators are associated with potential reclamation storage resource locations the actual reclamation of the storage resource locations can occur independently. The reclamation can be performed in response to a reclamation initiation trigger (e.g., scheduled time, periodic time, once a day, etc.).

In one embodiment, prior to performing the reclamation in block 320 the reclamation process includes resolving in flight input and output to the reclaimed storage locations. This can facilitate consistency maintenance even though the filesystem is reclaiming storage resource locations assigned to the application data file (e.g. application blocks, etc). In one exemplary implementation, the application block contents are checked before they are marked with an application fill on demand indicator. A system change indicator (e.g., unique signature in a block, a system change number, the sequential counter, etc.) that indicates a point in time when the changes initiated by an application (e.g., database etc.) can be checked. Each time an application attempts to update a storage block it can be assigned a system change timestamp. Before the block is marked as an application fill on demand the system change indicator can be examined to determine if there was a recent attempted update or not.

It is appreciated that marking with application fill on demand indications and actual reclamation of storage resources can happen at different times. In one embodiment, the marking (e.g., marking storage resources to be reclaimed, free space, etc.) can happen at a first time (e.g., T1, etc.) and the actual reclamation of the storage resources can occur at a second time (e.g., T2, etc.). In one exemplary implementation, the application can remain online continuously from the beginning of the marking (e.g., from before T1, etc.) through the completion of the reclamation (e.g., after T2, etc.). It is also appreciated that race conditions can be resolved and data consistency maintained. In one embodiment, a check is performed to determine if an application has attempted to write data to the marked storage resources. In one exemplary implementation, at the second time (e.g., T2, etc.) there is a comparison of information associated with the storage resources (e.g., storage locations, blocks, etc.) to determine if data has been written t the storage resources. A system change number (SCN) can also be checked to determine if the storage resources are indeed available for reclamation (e.g., free, etc.) before reclaiming the storage resources.

FIG. 4 is a block diagram of exemplary valid free space indication process 400 in accordance with one embodiment of the present invention. In one embodiment valid free space indication process 400 is similar to the valid free space indication process utilized in block 130.

In block 410, a valid free space indication is acquired. In one embodiment the valid free space indication is generated. In one embodiment, the valid free space indication generated by the valid free space indication process is based upon the location of the storage resource. The valid free space indication process includes ascertaining the valid free space indication. There are a variety of characteristics that can be examined and analyzed to develop the valid free space indication. In one embodiment, even though the data format of unused blocks differ from block the block, there can be a repeatable pattern within a block. In one embodiment, a change may occur in the block identification indication and the checksum from block to block but the block identification indication and the checksum remain constant within the block. A checksum algorithm can be developed using this information. The block identification and the checksum for a given block can be at fixed offsets from the beginning of the block and a checksum algorithm is developed using this information. The information can also be used in acquiring (e.g., retrieving, generating, etc.) an application specific valid free space indication (e.g., in block 410, etc.). In one embodiment, the valid free space indicator can be received from the application vendor.

In block 420, the valid free space indication is returned to attempted reads by an application (e.g., attempted reads directed to the reclaimed storage resource locations). In one embodiment, the valid free space indication includes the generated application specific checksum and block number. The block number can be derived from the offset and the application block size indication.

In one embodiment, two components can be utilized. The first component can include a user level component that interacts with the application (e.g., database, etc.). It can use SQL and get a freespace map including (file, offset, length) and the current system change number (SCN). This information is a passed to a kernel (e.g., a volume file server management kernel, etc.). In one exemplary implementation the information is passed using an input output control (e.g., ioctl, etc.) mechanism. The kernel then proceeds with an application fill on demand process. In one embodiment, if a storage resource range is already marked as application fill on demand then the range is ignored and remaining ranges are examined. A read/write exclusive lock is taken on one of the ranges. The lock can prevent other inputs and outputs to the file range. The range is read and a comparison of the SCN is performed. In one exemplary implementation a higher SCN implies the block changed recently. If the SCN is not higher the block is marked with an application fill on demand indicator. The lock on the range is released. These operations are performed for additional indicated ranges.

In one embodiment, storage resource locations associated with an application fill on demand indication that are the target of a new data write are allocated back to the application and the data is written in the storage locations.

FIG. 5 is a block diagram of an exemplary reclamation system 500 in accordance with one embodiment of the present invention. Reclamation system 500 includes primary storage resource 510, reclamation management component 550 and application 570. Primary storage resource 510 is communicatively coupled to reclamation management component 550 which is communicatively coupled to application 570. Primary storage resource 510 includes storage locations 521 through 528 and corresponding valid free space indicators 531 through 538. Application 570 forwards read and write requests directed at reading from and writing data to data locations 521 through 528. For example, application 570 can write the data 11111011 to storage location 521 and later read the data back. Application 570 can also indicate free spaces via reclamation management component 550 which directs reclamation of the storage resources. In one embodiment, reclamation management component 550 directs reclamation of storage location in accordance with a storage reclamation method (e.g., storage reclamation method 100, etc.).

Figure 6:
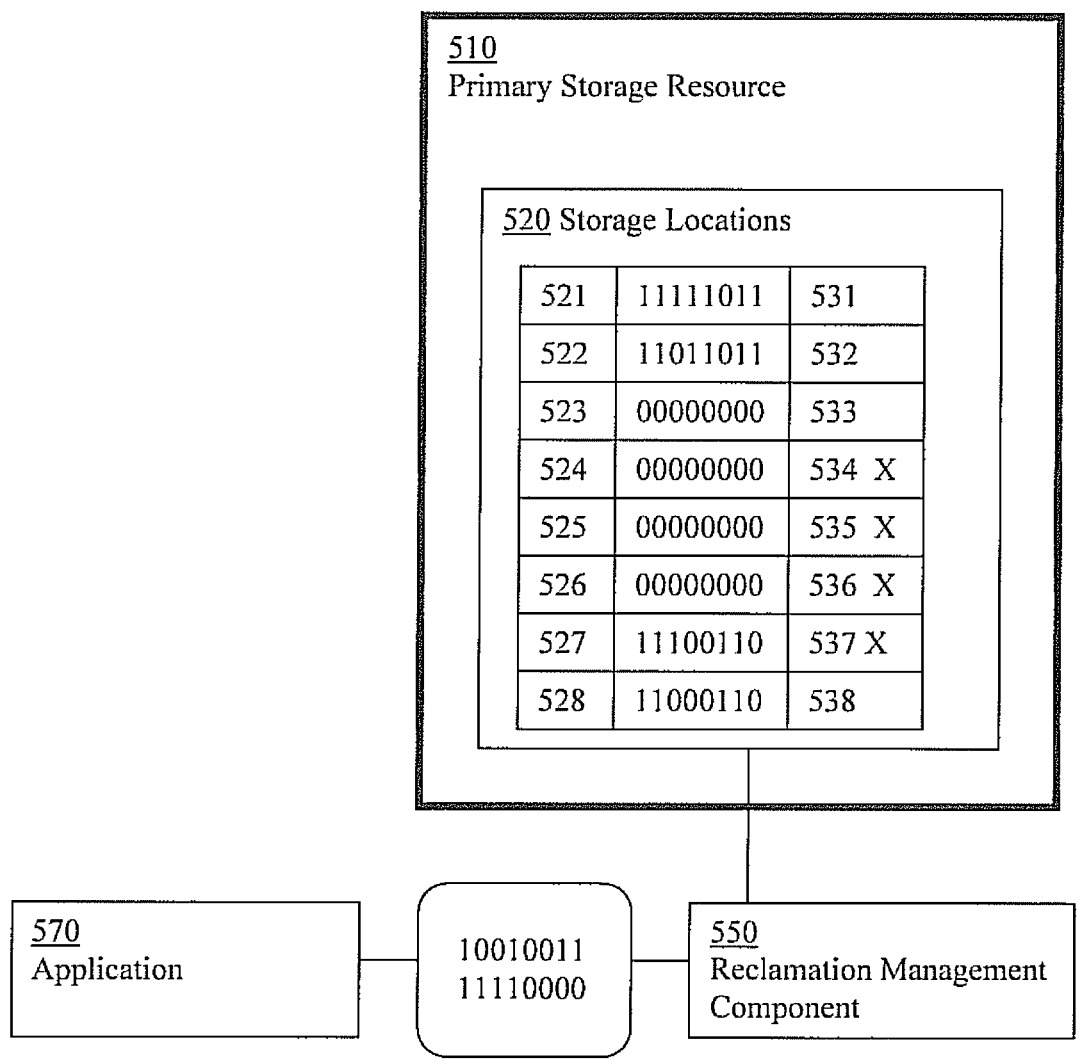
FIG. 6 is a block diagram of an exemplary reclamation system after reclamation in accordance with one embodiment of the present invention.

FIG. 6 is a block diagram of an exemplary reclamation system 500 after reclamation in accordance with one embodiment of the present invention. In one embodiment, valid free space indicators 534 through 537 are set and corresponding storage locations 524 through 527 are reclaimed. When application 570 attempts to read from these storage locations the reclamation manager generates corresponding valid free space indicators (e.g., 10010011 and 1111000 in one exemplary implementation) rather than the data stored in the storage locations (e.g., 00000000, etc.). The application 570 is able to recognize the valid free space indicators.

It is appreciated that present reclamation systems and methods facilitate reclamation that other approaches have difficulty achieving. For example, some unix approaches attempt to handle file holes gracefully in which a read through a file hole returns zeros. Some filesystems have zero fill on demand (ZFOD) capability which returns zeros without actually reading the associated disk blocks. A combination of holes and ZFOD technique can be used for reclaiming disk space where an application expects zeros for unused blocks. However, this is not compatible with some applications (e.g., databases, etc.) that expect application specific information other than zeros. The present reclamation systems and methods can generate application specific data for reads through a marked file region to facilitate reclamation of storage resources when an application does not initialize with zeros for freed/unused blocks.

In one embodiment, a database is divided into one or more logical storage units called tablespaces. A tablespace can include logical entities such as tables and indexes. The tablespace can be stored in one or more physical data files (e.g., Oracle database, etc.). The data is stored logically in tablespaces and physically in data files associated with the corresponding tablespace. In one exemplary implementation, a data file can be associated with one tablespace and one database. Tablespaces are further divided into logical units of storage called segments, that are then divided into extents. Extents are a collection of contiguous blocks in a data file. When a datafile is added to the database, the application initializes the data file with formatted blocks. The data format differs from block to block and is not constant. When a table is created in the tablespace, the blocks from these datafiles are allocated into the table and the application keeps a bitmap within each data file indicating which blocks are allocated to the table and which blocks are free. When table rows are deleted and purged, the application just updates the bitmap indication that a corresponding region is free and the freed up blocks are not initialized to zero.

FIG. 7 is a block diagram of storage resource reclamation module 700 which includes instructions for directing a processor in the performance of a storage resource reclamation method (e.g., storage resource reclamation method 100, etc.) in accordance with one embodiment of the present invention. Storage reclamation module 700 includes potential reclamation identification module 710, reclamation module 720 and valid free space indication module 730. Potential reclamation identification module 710 includes instructions for performing potential reclamation identification. In one embodiment, potential reclamation identification module 710 includes instructions for performing potential reclamation identification operations as indicated in block 110. Reclamation module 720 includes instructions for performing reclamation. In one embodiment, reclamation module 720 includes instructions for performing reclamation operations as indicated in block 120. Valid free space indication module 730 includes instructions for performing valid free space indication operations. In one embodiment, valid free space indication module 730 includes instructions for performing valid free space indication operations as indicated in block 130.

Figure 8:
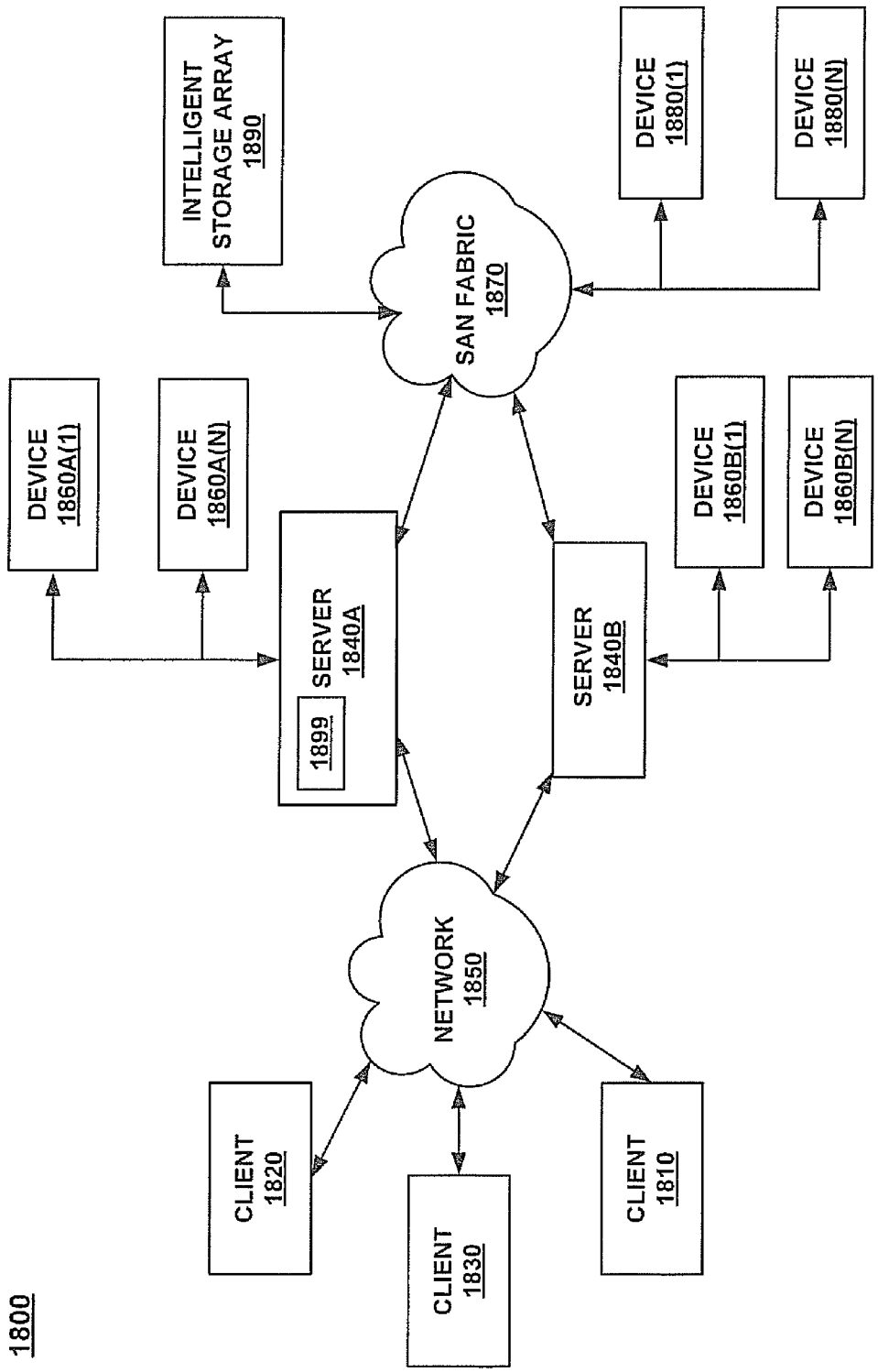
FIG. 8 is a block diagram depicting an exemplary network architecture in accordance with one embodiment of the present invention.

It is appreciated present storage reclamation systems and methods can be implemented as part of a variety of environments. For example, storage reclamation systems and methods can be implemented as part of a distributed computing environment, a cloud computing environment, a virtual environment, a client server environment, etc. In one embodiment, a storage reclamation method (e.g., storage reclamation method 100, etc.) can be implemented on a network. FIG. 8 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes storage reclamation module 1899. In one embodiment, storage reclamation module 1899 is similar to storage reclamation module 700. It is appreciated that present systems and methods are compatible with a variety of implementations. For example, portions of information and instructions associated with can be distributed in various resources.

Figure 9:
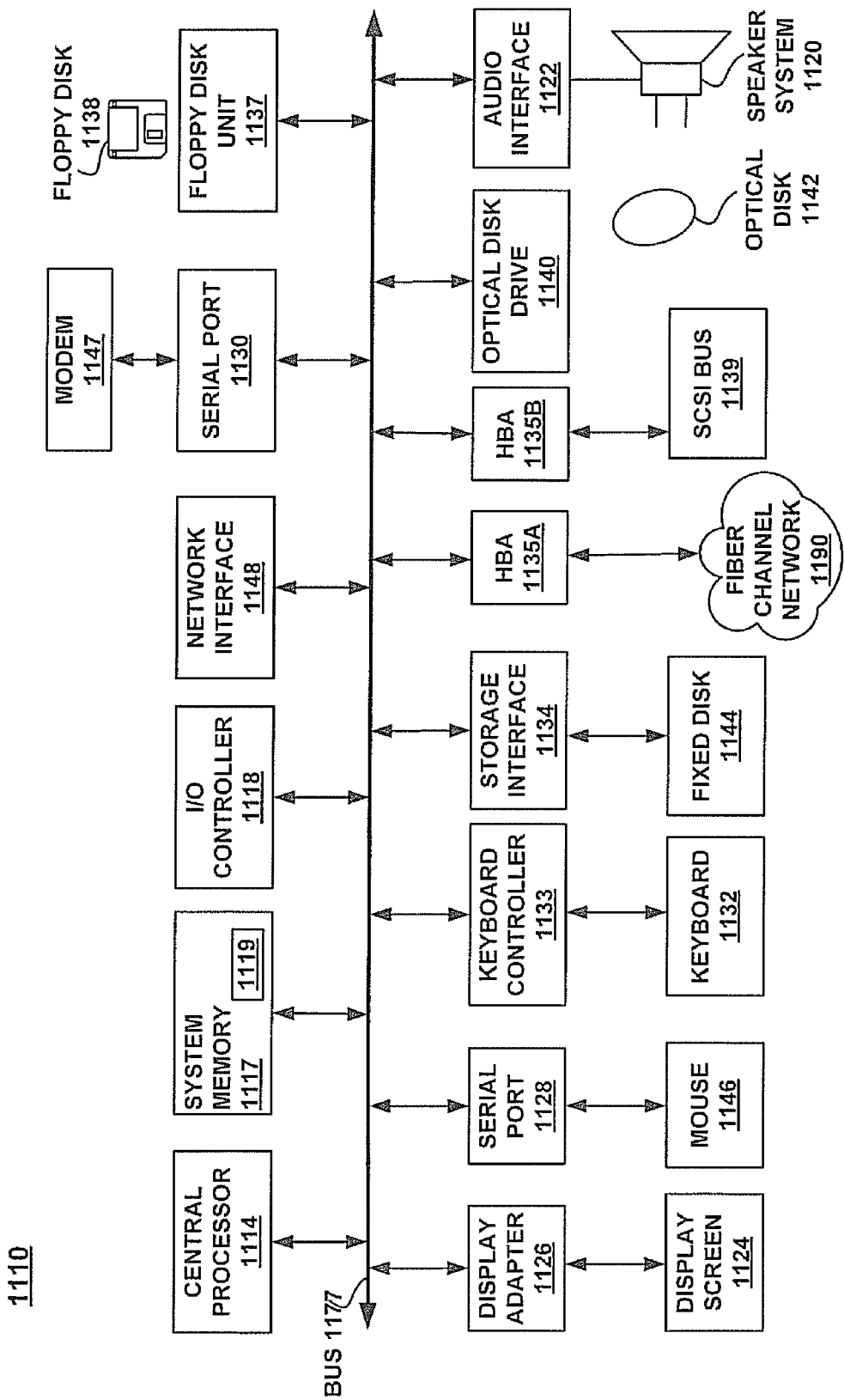
FIG. 9 depicts a block diagram of an exemplary computer system in accordance with one embodiment of the present invention.

FIG. 9 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing a storage reclamation method (e.g., similar to storage reclamation method 100, etc.) are stored in one or more memories of computer system 1100 (e.g., in memory location 1119). The RAM is generally the main memory into which the operating system and application programs are loaded. In one embodiment, RAM 1117 includes a storage reclamation module (e.g., in memory location 1119). In one embodiment, a storage reclamation module stored in memory location 1119 is similar to storage reclamation module 700. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 8 depicts the use of a network such as the Internet for exchanging data, but the present disclosure is not limited to the Internet or any particular network-based environment.

Thus, the present systems and methods facilitate efficient and storage resource management and reclamation. Unlike conventional attempts, systems and methods similar to those included in the present detailed description can facilitate consistent and convenient reclamation of free space associated with an application data file. The data reclamation operations of the present detailed descriptions facilitate keeping the reclamation from interfering with ongoing application operations (e.g., by returning valid free space indicators, etc.) and also help maintain data consistency. The data reclamation operations of the present detailed descriptions can also facilitate reduction of problems that may otherwise be associated with database verification tools and backup/restore tools.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A storage reclamation method comprising:
performing a potential reclamation identification process, wherein the potential reclamation identification process includes determining if there is the potential for reclaiming storage resources;
performing a reclamation process, wherein reclamation is performed on storage resources identified by the potential reclamation identification process as being eligible for reclamation, and wherein the storage resources correspond to free space associated with a data file; and
performing a valid free space indication process, wherein a valid free space indication process includes forwarding a valid free space indication recognizable to an application as a valid free space indication in place of data contained in a storage resource reclaimed by the reclamation process when the application attempts to direct a read to the storage resource reclaimed by the reclamation process, and wherein a valid free space indication is other than a repeated zero pattern.

2. The storage reclamation method of claim 1 wherein the valid free space indication is application specific.

3. The storage reclamation method of claim 1 wherein the reclaimed storage resources are marked with an application fill on demand indicator.

4. The storage reclamation method of claim 1 wherein the valid free space indication is a repeatable bit pattern and wherein zeros are not recognizable by the application as valid free space indications.

5. The storage reclamation method of claim 1 wherein the valid free space indication generated by the valid free space indication process is based upon the location of the storage resource.

6. The storage reclamation method of claim 1 wherein the application is a database.

7. The storage reclamation method of claim 1 wherein the reclamation process includes resolving in flight input and output to the reclaimed storage locations.

8. A reprogrammable non-transitory computer readable storage medium having stored thereon, computer executable instructions that when executed by a computer system cause the computer system to perform a method comprising:

performing a potential reclamation identification process, wherein the potential reclamation identification process includes determining if there is the potential for reclaiming storage resources;

performing a reclamation process, wherein reclamation is performed on storage resources identified by the potential reclamation identification process as being eligible for reclamation, and wherein the storage resources correspond to free space associated with a data file; and performing a valid free space indication process, wherein a valid free space indication process includes forwarding a valid free space indication recognizable to an application as a valid free space indication in place of data contained in a storage resource reclaimed by the reclamation process when the application attempts to direct a read to the storage resource reclaimed by the reclamation process, and wherein a valid free space indication is other than a repeated zero pattern.

9. The reprogrammable non-transitory computer readable storage medium of claim 8 wherein the valid free space indication is application specific.

10. The reprogrammable non-transitory computer readable storage medium of claim 8 wherein the reclaimed storage resources are marked with an application fill on demand indicator.

11. The reprogrammable non-transitory computer readable storage medium of claim 8 wherein the valid free space indication is a repeatable bit pattern and wherein zeros are not recognizable by the application as valid free space indications.

12. The reprogrammable non-transitory computer readable storage medium of claim 8 wherein the valid free space indication generated by the valid free space indication process is based upon the location of the storage resource.

13. The reprogrammable non-transitory computer readable storage medium of claim 8 wherein the application is a database.

14. The reprogrammable non-transitory computer readable storage medium of claim 8 wherein the reclamation process includes resolving in flight input and output to the reclaimed storage locations.

15. A computer system comprising a processor coupled to a computer readable storage media and executing computer readable code which causes the computer system to perform operations including:

performing a potential reclamation identification process, wherein the potential reclamation identification process includes determining if there is the potential for reclaiming storage resources;

performing a reclamation process, wherein reclamation is performed on storage resources identified by the potential reclamation identification process as being eligible for reclamation, and wherein the storage resources correspond to free space associated with a data file; and performing a valid free space indication process, wherein a valid free space indication process includes forwarding a valid free space indication recognizable to an application as a valid free space indication in place of data contained in a storage resource reclaimed by the reclamation process when the application attempts to direct a read to the storage resource reclaimed by the reclamation process, and wherein a valid free space indication is other than a repeated zero pattern.

16. The computer system of claim 15 wherein the valid free space indication is application specific.

17. The computer system of claim 15 wherein the reclaimed storage resources are marked with an application fill on demand indicator.

18. The computer system of claim 15 wherein the valid free space indication is a repeatable bit pattern and wherein zeros are not recognizable by the application as valid free space indications.

19. The computer system of claim 15 wherein the valid free space indication generated by the valid free space indication process is based upon the location of the storage resource.

20. The computer system of claim 15 wherein the reclamation process includes resolving in flight input and output to the reclaimed storage locations.

* * * * *